United States Patent [19]

Casella

[11] Patent Number: 4,492,715

[45] Date of Patent: Jan. 8, 1985

[54] USE OF HYDROLYZED WHEY PRODUCTS IN COMMINUTED MEAT PRODUCTS

[75] Inventor: Linda J. Casella, Ithaca, N.Y.

[73] Assignee: Corning Glass Works, Corning, N.Y.

[21] Appl. No.: 542,748

[22] Filed: Oct. 17, 1983

[51] Int. Cl.³ ............................................. A23L 1/31
[52] U.S. Cl. .................................... 426/646; 426/652
[58] Field of Search ............... 426/583, 646, 652, 657, 426/802

[56] References Cited

U.S. PATENT DOCUMENTS

| | | | |
|---|---|---|---|
| 3,930,056 | 12/1975 | Feminella et al. | 426/646 |
| 4,161,552 | 7/1979 | Melachouris | 426/646 |
| 4,165,391 | 8/1979 | Rolison | 426/583 X |
| 4,259,363 | 3/1981 | Lauck et al. | 426/646 |
| 4,293,583 | 10/1981 | Farr et al. | 426/657 |
| 4,348,420 | 9/1982 | Lynch et al. | 426/646 X |
| 4,407,833 | 10/1983 | Swartz | 426/657 X |

FOREIGN PATENT DOCUMENTS

| | | | |
|---|---|---|---|
| 964106 | 3/1975 | Canada | 426/646 |
| 0029503 | 6/1981 | European Pat. Off. | 426/41 |

Primary Examiner—Arthur L. Corbin
Attorney, Agent, or Firm—B. D. Voyce

[57] ABSTRACT

An extender for comminuted meat products based on hydrolyzed whey or hydrolyzed whey fractions is provided. The extender is equivalent to, but less expensive than, extenders used in the prior art, such as nonfat dry milk, and exhibits functional properties in the finished product including binding, emulsifying and flavor enhancement.

20 Claims, No Drawings

USE OF HYDROLYZED WHEY PRODUCTS IN COMMINUTED MEAT PRODUCTS

CROSS-REFERENCE TO RELATED APPLICATIONS

The use of hydrolyzed whey or a hydrolyzed whey fraction as a component of a dry or semi-dry fermented sausage is described and claimed in copending and commonly assigned application Ser. No. 542,704, pending filed of even date in the name of Linda J. Casella.

BACKGROUND OF THE INVENTION

1. Field of the Invention

This invention relates to comminuted meat products and in particular to the use of hydrolyzed whey or a hydrolyzed whey fraction in such products.

2. Description of the Prior Art

As generally understood in the art, comminuted meat products are those food products which include chopped, ground, pulverized or finely divided animal or poultry meat, meat by-products, or combinations thereof as a major component of the finished product. The United States Department of Agriculture has defined various types of comminuted meats in 9 C.F.R. §319, et seq. For example, the required compositions of such premium products as frankfurters, weiners, bologna, garlic bologna, braunschweiger, knockwurst and similar cooked sausages are defined in 9 C.F.R. §319.180. Similarly, the composition of beef patties is defined in 9 C.F.R. §319.15. The composition of non-specific loaves, such as olive loaf, is defined in 9 C.F.R. §319.280.

Comminuted meat products typically include a meat component, a flavoring component, an extender component, and in many cases, a coloring and/or a preservative component. This invention relates to the extender component, and in particular, to a new, inexpensive material for use as the extender component.

In the past, expensive extenders, such as nonfat dry milk and hydrolyzed vegetable protein, have been used in comminuted meat products. Attempts to use less expensive extenders have been on-going. One series of attempts has been directed to using whey, the by-product of cheese manufacturing, as an extender.

Whey typically contains, per liter, approximately 6 to 9 grams of protein, 45 to 50 grams of lactose, 6 to 8 grams of mineral salts, and 1 to 2 grams of fat. On a world-wide basis, the production of whey each year is estimated to be over 50 billion pounds. Whey thus represents a potentially important natural source of food for human consumption, provided it can be modified from its original state so as to make it palatable and functional in combination with other food ingredients.

Unfortunately, whey, as it is produced during the cheese manufacturing process, is of limited value as an extender, or for that matter, for anything else. Indeed, in the past, whey was regarded as a waste product and was discharged into sewers or streams and rivers. Today, however, because of increasing concerns over environmental pollution, much of the whey which is produced is subjected to some processing so that at a minimum it can be used as animal feed. Using whey as an animal feed, however, is a low value application and does not effectively take advantage of the tree food value of whey.

Prior attempts to use whey as an extender for comminuted meats have suffered various disadvantages. Thus, U.S. Pat. No. 3,930,056 describes partially delactosing the whey and then fractionating the delactosed product by passing it through a bed containing a molecular sieve resin. The second fraction from the resin bed is used as the extender. This procedure is both complicated and results in significant loss of food value as a result of the delactosing step.

U.S. Pat. No. 4,161,552 describes a multi-step process which includes adjusting the pH of a whey solution containing at least 20% acid whey or adjusting the pH and adding a divalent metal ion, such as calcium, to a sweet whey solution to produce a precipitate which constitutes the extender.

U.S. Pat. No. 4,259,363 describes combining whey derived materials, such as those described in U.S. Pat. No. 3,930,056, supra, with up to 50% casein or its salts to produce a comminuted meat extender. U.S. Pat. No. 4,165,391, although not directly concerned with meat extenders, describes a meat-related use for whey in which a whey-derived material is mixed with 50–80% hydrolyzed vegetable protein and 10–25% yeast autolysate to produce a meaty flavoring agent for addition to soups, gravies, snack foods, seasoning mixes and the like.

European Patent Application No. 0029503 describes culturing whey protein with a yogurt-type fermentation culture, blending the resulting product with such materials as whey protein concentrate, nonfat dried milk, sodium caseinate or corn syrup solids and spray-drying the blend to produce the desired extender. The extender can be used in tangy comminuted meat products, such as fermented sausages.

SUMMARY OF THE INVENTION

It is an object of this invention to overcome the problems in the prior art relating to the use of whey as an extender in comminuted meat products. In particular, it is an object of the invention to provide a whey-based extender for comminuted meats which is easy to prepare, retains the food value of the lactose component of whey and exhibits functional properties in the finished comminuted meat product.

In accordance with the invention, it has been found that when the lactose component of whey or a whey fraction has been hydrolyzed the resulting product is especially useful as an extender for comminuted meats. In particular, it has been found that extenders composed of hydrolyzed whey or a hydrolyzed whey fraction exhibit excellent functional properties in comminuted meat products including the properties of emulsification, overall binding and flavor-enhancement. In contrast, whey or whey fractions which have not been subjected to hydrolysis do not exhibit these properties.

As described in detail below, hydrolyzed whey materials work so successfully as a meat extender that they can be used to replace such expensive extenders as non-fat dry milk without any significant perceived differences in the color, texture, flavor and general acceptance of the final product. In view of the low cost of whey, this represents an effective way to reduce the cost of comminuted meat products and, at the same time, utilize the food value in whey.

In accordance with one aspect of the invention, a comminuted meat product is provided which comprises:

a. a meat or meat by-product containing mixture suitable for making a comminuted meat product; and b. an extender comprising hydrolyzed whey or a hydrolyzed whey fraction, which extender has a protein content of from about 2 to about 90 percent on a dry weight basis and which had, before hydrolysis, a lactose content of from about 5 to about 85 percent on a dry weight basis, which lactose is at least about 30 percent hydrolyzed.

In accordance with another aspect of the invention, a method for extending comminuted meat products is provided which comprises admixing, with a meat or meat by-product containing mixture, sutable for making a comminuted meat product, an extender comprising hydrolyzed whey or a hydrolyzed whey fraction which has a protein content of from about 2 to about 90 percent on a dry weight basis and which had, before hydrolysis, a lactose content of from about 5 to about 85 percent on a dry weight basis, which lactose is at least about 30 percent hydrolyzed.

In certain preferred embodiments, the protein content of the extender is from about 8 to about 60 percent on a dry weight basis; the extender had, before hydrolysis, a lactose content of from about 20 to about 85 percent on a dry weight basis, and the lactose is at least about 40 percent hydrolyzed.

In other preferred embodiments, the protein content of the extender is from about 8 to about 20 percent on a dry weight basis and the extender had, before hydrolysis, a lactose content of from about 60 to about 80 percent on a dry weight basis, which lactose is at least about 70 percent hydrolyzed.

As used herein, the term "whey" means whey as obtained from a cheese manufacturing process, i.e., whole whey. The term "whey fraction" applies to whey which has had one or more constituents either wholly or partially removed. Examples of the more common whey fractions include, by way of illustration only, when permeate, which is whey from which a substantial amount of protein has been removed, typically by ultrafiltration; demineralized whey, which is whey from which part or all of the mineral (inorganic) salts have been removed; and whey protein concentrate, which is the protein-enriched fraction obtained by ultrafiltration (whey permeate, of course, is the other fraction).

Also, as used herein, the expression "meat or meat by-product" encompasses all types of materials resulting from the slaughtering of animals and poultry. Examples of the more commonly used meat or meat by-products employed in comminuted meat products include, by way of illustration only, beef, beef trim, pork, pork trim, pork livers, pork jowls, chicken, turkey, veal and lamb. Particularly preferred meat or meat by-products for use with the present invention constitute one or more kinds of skeletal muscle meat or skeletal muscle meat and poultry meat.

In general, hydrolysis of the whey or whey fraction can be accomplished by any known means. Thus, hydrolysis can be carried out by chemical methods or enzymatic methods which, in the latter case, can utilize either soluble or immobilized enzymes. Enzymatic hydrolysis is preferred, and the use of immobilized enzymes is most preferred.

DESCRIPTION OF THE PREFERRED EMBODIMENTS

As discussed above, the present invention provides a new extender comprising hydrolyzed whey or a hydrolyzed whey fraction for comminuted meat products.

The composition and method of preparation of comminuted meat products are well known to persons having ordinary skill in the art. By way of illustration only, specific recipes and methods of preparation are described below for representative frankfurter, braunschweiger and olive loaf products. The ingredients, quantities and methods of preparation used in these examples are not critical and other recipes and procedures can be used and will be readily apparent to those of ordinary skill in the art.

In accordance with the most preferred embodiment of the invention, the hydrolysis of the whey or whey fraction is performed by means of immobilized enzymes. Hydrolysis by this approach is well known to those having ordinary skill in the art. By way of illustration only, H. H. Weetall et al., *Biotechnol. Bioeng.*, 16, 295 (1974), reports the preparation of immobilized lactase and its use in the enzymatic hydrolysis of acid whey. The enzyme, isolated from both fungi and yeast, was immobilized on zirconia-coated porous glass particles. The substrate consisted of either an aqueous lactose solution or acid whey permeate.

Additionally, L. E. Wierzbicki et al., *Biotechnol. Bioeng.*, 16, 397 (1974), discusses the hydrolysis of lactose in acid whey using lactose immobilized on porous glass particles with emphasis on the preparation and characterization of a reusable catalyst for the production of low-lactose dairy products. Partially purified lactases from *Aspergillus niger*, *Lactobacillus helveticus*, and *Saccharomyces lactis* were immobilized on porous glass particles. The substrate consisted of acid whey powder which had been reconstituted in water to the appropriate solids concentration. In some instances, the reconstituted acid whey was deproteinized by heating in a boiling water bath for five minutes.

Moreover, H. H. Weetall et al., *Biotechnol. Bioeng.*, 16, 689 (1974), describes the preparation of immobilized lactase as part of continued studies on the enzymatic hydrolysis of lactose. A fungal lactase was employed, immobilized on zirconia-coated controlled-pore glass and porous titania particles. The resulting immobilized enzyme preparations were used for the hydrolysis of lactose in whole sweet whey, whole acid whey, acid whey ultrafiltrate (permeate), and pure lactose.

An especially useful process for hydrolyzing lactose is disclosed in copending and commonly assigned application Ser. No. 269,945 filed July 3, 1981, now U.S. Pat. No. 4,409,247, in the names of Jean-Luc A. Guy Baret and Luc A. Dohan. The process involves heating the whey to a temperature of from about 45° C. to about 90° C. for at least about 15 seconds, centrifuging the heated whey while it is still warm, and contacting the centrifuged whey with an immobilized lactase under conditions sufficient to hydrolyze at least a portion of the lactose contained therein into glucose and galactose.

With regard to the composition of the extender, its protein content is generally between from about 2 to about 90 percent on a dry weight basis and its lactose content, before hydrolysis, is generally from about 5 to about 85 percent on a dry weight basis. At least about 30 percent of the lactose in the extender must be hydrolyzed for the extender to exhibit binding, emulsifying and flavor-enhancing functions in the finished comminuted meat product.

The protein content of the extender preferably is from about 8 to about 60 percent on a dry weight basis, with from about 8 to about 20 percent on a dry weight basis being more preferred.

Preferably, the lactose content of the extender before hydrolysis was from about 20 to about 85 percent on a dry weight basis. More preferably, the lactose content of the extender before hydrolysis was from about 60 to about 80 percent on a dry weight basis.

The lactose in the extender preferably is at least about 40 percent hydrolyzed; more preferably, at least about 70 percent of such lactose is hydrolyzed.

In an especially preferred embodiment, the protein content of the extender is from about 8 to about 60 percent on a dry weight basis and the extender had, before hydrolysis, a lactose content of from about 20 to about 85 percent on a dry weight basis, which lactose is at least about 40 percent hydrolyzed. Most preferably, such lactose is at least about 70 percent hydrolyzed.

In another especially preferred embodiment, the protein content of the extender is from about 8 to about 20 percent on a dry weight basis and the extender had, before hydrolysis, a lactose content of from about 60 to about 80 percent on a dry weight basis, which lactose is at least about 40 percent hydrolyzed, and most preferably at least about 70 percent hydrolyzed.

Without intending to limit it in any manner, the present invention will be more fully described by the following examples which compare the extender of the invention with prior art extenders and which illustrate certain preferred embodiments of the invention. In particular, comparison tests are presented employing four extenders: (1) nonfat dry milk, (2) a non-hydrolyzed whey/casein blend (also referred to herein as a "whey/casein blend"), (3) hydrolyzed whey and (4) demineralized hydrolyzed whey. Frankfurters, braunschweiger and olive loaves were prepared using each of the four extenders. The products were compared for ease of manufacture, processing yields, refrigerated shelf-life and consumer appeal. As discussed in detail below, the two hydrolyzed whey extenders quite unexpectedly were found to perform as well as the commercial nonfat dry milk and non-hydrolyzed whey/casein blend extenders with regard to each of these variables.

The nonfat dry milk used in the tests was "Superheat Nonfat Dry Milk", sold by Land O'Lakes, Inc., Eau Claire, Wis. This product, as described by the manufacturer, is specifically formulated for use in, among other things, sausage products. Its composition, according to the manufacturer, is:

| Ingredient | Weight Percent |
|---|---|
| Protein | 35.00% |
| Moisture | 3.5% |
| Carbohydrate | 51.00% |
| Butterfat | 0.80% |
| Minerals (Ash) | 8.60% |
| Whey Protein Nitrogen | 1.00 mg per gm |

The non-hydrolyzed whey/casein blend used was Savorlac 600, sold by Western Dairy Products, San Francisco, Calif. According to the manufacturer, this product is formulated from whey and edible casein for use in non-specific sausages. The manufacturer describes its composition as follows:

| Ingredient | Weight Percent |
|---|---|
| Protein (N × 6.38 as is) | 35.0% |
| Minerals (as ash) | 7.7% |
| Lactose | 51.0% |
| Fat | 1.5% |
| Moisture | 4.0% max. |

The hydrolyzed whey used in the exemplary tests was supplied as a spray-dried powder by Corning BIOsystems, Corning Glass Works, Corning, N.Y. The lactose originally present was approximately 90 percent hydrolyzed. The composition of this powder was typically:

| Ingredient | Weight Percent |
|---|---|
| Protein | 14.0% ± 2% |
| Ash | 10.0% ± 2% |
| Lactose | 10.0% ± 2% |
| Glucose | 30.0% ± 2% |
| Galactose | 30.0% ± 2% |

The demineralized hydrolyzed whey was also supplied as a spray-dried powder by Corning BIOsystems, Corning Glass Works, Corning, N.Y. The lactose originally present was approximately 90 percent hydrolyzed and the extent of demineralization was about 50 percent. The composition of this powder typically was:

| Ingredient | Weight Percent |
|---|---|
| Protein | 14.0% ± 2% |
| Ash | 6.0% ± 2% |
| Lactose | 9.0% ± 2% |
| Glucose | 31.0% ± 2% |
| Galactose | 31.0% ± 2% |

Both of these powders typically included some moisture, e.g., 4-6%, and a small amount of fat.

Using these four extenders, frankfurters, braunschweiger chubs and olive loaves wwere prepared and tested as described in the following examples.

EXAMPLE 1

Four batches of frankfurters were prepared having the following composition, typical for products of this type. The beef-and-pork content was formulated for a calculated 30% final fat level based on an estimated 9% smokehouse shrink.

| Ingredient | (lbs/cwt) |
|---|---|
| Lean Beef (12% Fat) | 53.9 |
| Pork Trim (68% Fat) | 46.1 |
| | 100.0 |
| Water/Ice | 30.0 |
| Salt | 3.0 |
| Corn Syrup Solids | 2.0 |
| Dextrose | 1.0 |
| Liquid Frank Seasoning | 0.45 |
| Liquid Smoke | 0.12 |
| Garlic Powder | 0.02 |
| Sodium Erythorbate | 0.05 |
| Sodium Nitrite | 0.12 |
| Extender | 3.5 |

Each batch was made with one of the four extenders described above. Manufacturing and processing parameters were held constant for the four batches.

The frankfurters were prepared in a standard way by grinding the beef (¼" plate) and pork trim (⅛" plate); chopping the meats, salt, water/ice, and other ingredients together until a temperature of 42°-44° F. was reached; adding the liquid smoke; emulsifying the resulting mixture twice (1.0 mm plate); stuffing the product into casings and forming links; smoking the links with natural smoke and then steam until a 152° F. internal temperature was reached; and chilling and vacuum packaging the finished frankfurters.

No processing difficulties or differences among the four extenders were noted in manufacturing the frankfurters. The demineralized hydrolyzed whey was noted to be somewhat more hygroscopic than the other extenders with a tendency to clump together rather than being a free-flowing powder. However, the clumps chopped into the emulsion readily. All four raw emulsions exhibited very similar bind characteristics. Raw emulsion temperatures from the emulsifier were all between 62°–64° F.

Final processing yields for the four products were as follows:

| Product | % Yield |
| --- | --- |
| 3.5% Nonfat Dry Milk | 91.5 |
| 3.5% Whey/Casein Blend | 91.3 |
| 3.5% Hydrolyzed Whey | 90.9 |
| 3.5% Demineralized Hydrolyzed Whey | 90.7 | where "% Yield" was defined as:

$$\% \text{ Yield} = \frac{\text{Final Processed Weight}}{\text{Initial Raw Weight}} \times 100$$

Analysis of the four batches of frankfurters showed them to be very similar in composition (moisture, protein, fat, ash, carbohydrates, pH). The results of the analysis are shown in Table I.

did not result in microbial contamination, these products were still well within commercial standards.

The taste panel evaluations after one, three and five weeks of refrigerated storage showed all four products very acceptable throughout the storage interval. The panelists made their evaluations in booths under normal lighting conditions. The products were simmered for five minutes and served warm without condiments. The panelists rated the products on a 9-point hedonic scale and a composite score for each product at weeks 1, 3 and 5 was calculated as the mean score of the panelists after analysis of variance (elimination of panelists more than 1.5 standard deviations from the mean). The results are shown in Table II.

TABLE II

| PRODUCT | SENSORY PREFERENCE EVALUATION - FRANKFURTERS Week 1/Week 3/Week 5 | | | |
| --- | --- | --- | --- | --- |
| | COLOR | TEXTURE | FLAVOR | GENERAL ACCEPTANCE |
| 3.5% Nonfat Dry Milk | 7.06/7.59/7.56 | 6.95/7.12/7.56 | 7.12/6.95/7.47 | 6.81/7.17/7.08 |
| 3.5% Whey/Casein Blend | 7.31/7.76/7.78 | 6.90/7.53/7.44 | 7.29/7.35/7.53 | 6.75/7.28/7.31 |
| 3.5% Hydrolyzed Whey | 7.69/7.41/7.72 | 7.35/7.12/7.63 | 7.53/6.60/7.35 | 7.19/6.78/7.23 |
| 3.5% Demineralized Hydrolyzed Whey | 7.31/7.65/7.44 | 6.80/7.59/7.31 | 7.29/7.50/7.18 | 6.81/7.50/7.00 |

Analysis of this data revealed no significant ($P > 0.05$) differences in preference for any of the products in any of the tested parameters (color, texture, flavor, general acceptance) during any of the intervals of refrigerated storage. The hydrolyzed whey products, even when not demineralized, did not appear to contribute a salty flavor to the products. Several panelists commented that the hydrolyzed whey products were sweeter, but this did not appear to affect flavor preference scores. Panelists commented that all the products were similar with no detectable differences. In sum, the hydrolyzed whey extenders were found to be equivalent to the nonfat dry milk aand the whey/casein blend extenders with regard to functionality, processing characteristics and consumer acceptance in the frankfurter products.

EXAMPLE 2

Four batches of braunschweiger were prepared having the following composition, typical for products of this type:

TABLE I

| DESCRIPTION | FRANKFURTER ANALYSIS | | | | | |
| --- | --- | --- | --- | --- | --- | --- |
| | % MOISTURE | % PROTEIN | % FAT | % ASH | % CARBOHYDRATES | pH |
| 3.5% Nonfat Dry Milk | 5.0 | 36.0 | 0.4 | 8.0 | 50.6 | 6.62 |
| 3.5% Whey/Casein Blend | 3.5 | 36.8 | 0.3 | 7.3 | 52.1 | 6.51 |
| 3.5% Hydrolyzed Whey | 7.8 | 12.6 | 1.4 | 9.1 | 69.1 | 4.80 |
| 3.5% Demineralized Hydrolyzed Whey | 7.3 | 14.5 | 1.5 | 5.5 | 71.2 | 4.61 |

The finished, vacuum packaged frankfurters were stored at 40° F. for microbiological and organoleptic (by taste panel) evaluation after one, three and five weeks of refrigerated storage. Microbiological evaluation (total surface counts/gm 20C) over the storage period showed no significant differences in the four products. Counts remained low throughout the storage interval. The free package moisture (purge or exudate in the vacuum-packaged products) increased slightly over the storage interval. Slightly higher free package moisture was observed for the frankfurters using the hydrolyzed whey extenders, but since this free water

| Ingredient | (lbs/cwt) |
| --- | --- |
| Pork Livers | 50.0 |
| Pork Jowls | 50.0 |
| | 100.0 |
| Salt | 2.25 |
| Prague Powder | 0.25 |
| Corn Syrup Solids | 2.5 |
| Seasoning | 2.4 |
| Extender | 3.5 |

Each batch was made with one of the four extenders described above. The braunschweiger chubs were prepared in a standard way by cooking the pork jowls to 160° F.; chopping the livers, jowls and dry ingredients together; running the chopped mixture through an emulsifier twice (1.0 mm plate); stuffing the emulsified mixture into casings; processing the stuffed casings in 170° F. steam until a 158°-160° F. internal temperature was reached; and chilling and vacuum packaging the finished chubs.

No processing difficulties or differences among the four extenders were noted in manufacturing the chubs. As with the franks, the demineralized hydrolyzed whey, although somewhat more hygroscopic and thus lumpy, chopped into the emulsion readily. All four batches appeared to have the same bind and color, and no differences in raw emulsion characteristics were noted. The product made with demineralized hydrolyzed whey seemed slightly softer and thus somewhat more difficult to slice than the other products. Slight gel pockets were observed, as well as a slightly more crumbly texture. However, overall this product was deemed to be commercially acceptable in that the product did not develop microbial contamination, was sliceable and had good flavor.

Analysis of the four batches showed them to have very similar compositions. The analytical results are shown in Table III.

TABLE III
BRAUNSCHWEIGER CHUBS ANALYSIS

| DESCRIPTION | % MOISTURE | % PROTEIN | % FAT |
|---|---|---|---|
| 3.5% Nonfat Dry Milk | 45.6 | 13.5 | 33.9 |
| 3.5% Whey/Casein Blend | 46.6 | 14.4 | 31.8 |
| 3.5% Hydrolyzed Whey | 47.5 | 13.4 | 31.2 |
| 3.5% Demineralized Hydrolyzed Whey | 49.0 | 13.6 | 30.6 |

The finished chubs, after vacuum packaging, were held at 40° F. for shelf-life evaluations. Microbiological results (total counts/gm 35C) showed no significant differences in the products and low counts were found throughout the storage period. Sensory preference panels after 3 and 5 weeks refrigerated storage (Table IV) showed no significant differences (P>0.05) in preference for the products in the tested parameters (color, texture, flavor, general acceptance). The panels tests and rating calculations were performed in the same way as for the frankfurters. The products were sliced and served on crackers with no other condiments.

In addition to the foregoing, a fifth batch of braunschweiger was prepared using hydrolyzed whey whose pH had been adjusted to 6.0 by the addition of sodium hydroxide. In comparison to the other four batches, this additional batch gave a somewhat tighter, thicker emulsion and a somewhat less red color. As with the other batches, the final product had a good finished appearance and good emulsion stability. Analysis of the final product for this batch revealed the following composition: moisture—45.9%; protein—15.3%; and fat—28.8%.

TABLE IV
SENSORY PREFERENCE EVALUATION - BRAUNSCHWEIGER
Week 3/Week 5

| PRODUCT | COLOR | TEXTURE | FLAVOR | GENERAL ACCEPTANCE |
|---|---|---|---|---|
| 3.5% Nonfat Dry Milk | 7.46/7.65 | 7.44/7.41 | 7.50/7.33 | 7.14/7.40 |
| 3.5% Whey/Casein Blend | 7.54/7.65 | 7.69/7.41 | 7.83/7.33 | 7.57/7.40 |
| 3.5% Hydrolyzed Whey | 7.46/7.47 | 7.06/7.18 | 7.25/7.27 | 7.29/7.00 |
| 3.5% Demineralized Hydrolyzed Whey | 7.69/7.71 | 7.25/7.53 | 7.75/7.53 | 7.57/7.60 |

Overall, the hydrolyzed whey extenders were found to be equivalent to the nonfat dry milk and the whey/casein blend extenders with regard to functionality, processing characteristics and consumer acceptance in the braunschweiger products.

EXAMPLE 3

Three batches of olive loaf were prepared having the following composition, typical for a product of this type:

| Ingredient | Weight Percent |
|---|---|
| Lean Beef Trim (15% Fat) | 39.0% |
| Pork Jowls (65% Fat) | 11.0% |
| Water/Ice | 21.4% |
| Salt | 1.8% |
| Pitted Spanish Olives | 9.6% |
| Diced Sweet Red Peppers | 5.8% |
| Spice Blend | 3.4% |
| Sodium erythorbate | 0.04% |
| Sodium nitrite | 0.01% |
| Extender | 8.0% |

The first two batches were made with the nonfat dry milk and the whey/casein blend extenders described above. The third batch was made with hydrolyzed whey (described above) whose pH had been raised to approximately 6.0, using sodium hydroxide. At the 8% addition level used in this product, it was found necessary to neutralize the normally acidic hydrolyzed whey so as to produce a stable emulsion.

The olive loaves were prepared in a standard way by grinding the meats (½" plate); chopping all ingredients, other than the olives and peppers, together until a temperature of 45° F. was reached; running the chopped mixture through an emulsifier (1.0 mm plate); washing and draining the olives and peppers and then mixing them into the emulsified mixture under vacuum; stuffing the mixture into square molds and loaf pans using a Frey Stuffer; smoking the product with natural smoke and then steam until a 152° F. internal temperature was reached; and chilling and vacuum packaging the finished loaves.

All three raw emulsions were noted to be sticky and exhibited good bind as raw emulsions. The nonfat dry milk formulation formed the driest raw emulsion, and the buffered hydrolyzed whey formulation formed the loosest raw emulsion. The hydrolyzed whey product dusted during addition to the chopper which may have had an effect on the looseness of the emulsion. No other processing differences were noted in manufacturing of the three products.

Final processing yields for the three products were as follows:

| Product | % Yield |
|---|---|
| 8% Nonfat Dry Milk | 97.2 |
| 8% Whey/Casein Blend | 97.4 |
| 8% Hydrolyzed Whey (pH 6.0) | 96.6 |

Analysis of the three batches showed them to have very similar compositions. The analytical results are shown in Table V.

Overall, the hydrolyzed whey extender was found to be equivalent to the nonfat dry milk and whey/casein blend extenders with regard to processing parameters.

Sensory preference evaluations for a six-week storage period show acceptable scores for all parameters (see Table VI). No significant differences (P>0.05) in preference were observed in flavor or general acceptance scores for the three products over the storage interval. However, a significant difference (P≦0.05) in preference was observed in texture and color scores at 4 and 6 weeks storage, respectively, with the hydrolyzed whey product receiving the lowest scores. It is believed that this may be due to reduced solubility of the product because of the increased pH.

Microbial counts were found to be high throughout the six week storage period, with no difference observed between the three products.

In sum, the buffered hydrolyzed whey extender was found to produce a finished product which was commercially acceptable and comparable to the products produced with the nonfat dry milk and whey/casein blend extenders.

TABLE V
OLIVE LOAF ANALYSIS

| DESCRIPTION | % MOISTURE | % PROTEIN | % FAT | pH |
|---|---|---|---|---|
| 8% Nonfat Dry Milk | 66.9 | 12.9 | 11.3 | 6.25 |
| 8% Whey/Casein Blend | 66.8 | 11.7 | 11.5 | 6.26 |
| 8% Hydrolyzed Whey (pH 6.0) | 67.5 | 10.7 | 11.8 | 6.26 |

TABLE VI
SENSORY PREFERENCE EVALUATION - OLIVE LOAF
Week 2/Week 4/Week 6

| PRODUCT | COLOR | TEXTURE | FLAVOR | GENERAL ACCEPTANCE |
|---|---|---|---|---|
| 8% Nonfat Dry Milk | 7.1/7.5/6.9 | 7.4/7.2/6.7 | 7.1/7.0/6.6 | 7.0/6.9/6.5 |
| 8% Whey/Casein Blend | 7.3/7.6/7.2 | 7.5/7.3/7.1 | 7.1/6.9/7.2 | 7.2/6.7/6.8 |
| 8% Hydrolyzed Whey (pH 6.0) | 6.8/7.0/6.4 | 7.5/6.5/6.7 | 7.1/6.6/6.4 | 6.8/6.0/6.2 |

EXAMPLE 4

To illustrate some of the effects of hydrolyzing the whey, a batch of frankfurters was prepared with non-hydrolyzed whey, rather than hydrolyzed whey. The non-hydrolyzed whey had the following composition:

| Ingredient | Weight Percent |
|---|---|
| Protein | 14.0% |
| Ash | 10.0% |
| Lactose | 72.0% |

The frankfurters had the same ingredients as the frankfurters of Example 1 and were prepared in the same way. It was found that the non-hydrolyzed whey produced emulsions which were slower to drop to emulsion temperature. Also, the finished franks were tougher and less juicy.

It is to be understood that the foregoing detailed description is given merely by way of illustration and that many variations thereof may be made without departing from the spirit or scope of the invention. For example, the definition of the extender is deemed to cover reconstituted hydrolyzed whey products and reconstituted hydrolyzed whey fractions. Additionally, such definition includes synthetic hydrolyzed whey and synthetic hydrolyzed whey fractions, i.e., any composition obtained by combining whey or other protein with appropriate amounts of lactose and/or glucose and galactose whereby such composition meets the requirements of the extender as defined. Also, although the hydrolyzed whey products have been illustrated as the sole extenders in the various representative comminuted meat products discussed, it is to be understood that they can be used in combination with other extenders, for example, in combination with nonfat dry milk. Other variations will be apparent to one having ordinary skill in the art.

What is claimed is:

1. A comminuted meat product comprising:
   a. a meat or meat by-product containing mixture suitable for making a comminuted meat product; and
   b. an extender comprising lactose hydrolyzed whey which has a protein content of from about 2 to about 90 percent on a dry weight basis and which had, before hydrolysis, a lactose content of from about 5 to about 85 percent on a dry weight basis, which lactose is at least about 30 percent hydrolyzed.

2. The comminuted meat product of claim 1 in which the lactose is at least about 40 percent hydrolyzed.

3. The comminuted meat product of claim 1 in which the lactose is at least about 70 percent hydrolyzed.

4. The comminuted meat product of claim 1 in which the protein content of the hydrolyzed whey is from about 8 to about 60 percent by weight.

5. The comminuted meat product of claim 1 in which the protein content of the hydrolyzed whey is from about 8 to about 20 percent by weight.

6. The comminuted meat product of claim 1 in which the hydrolyzed whey had, before hydrolysis, a lactose content of from about 20 to about 85 percent by weight.

7. The comminuted meat product of claim 1 in which the hydrolyzed whey had, before hydrolysis, a lactose content of from about 60 to about 80 percent by weight.

8. The comminuted meat product of claim 1 in which the hydrolyzed whey has a protein content of from about 8 to about 60 percent by weight and had, before hydrolysis, a lactose content of from about 20 to about 85 percent by weight, which lactose is at least about 40 percent hydrolyzed.

9. The comminuted meat product of claim 1 in which the hydrolyzed whey has a protein content of from about 8 to about 20 percent by weight and had, before hydrolysis, a lactose content of from about 60 to about 80 percent by weight, which lactose is at least about 40 percent hydrolyzed.

10. The comminuted meat product of claim 1 which also contains at least one extender in addition to lactose hydrolyzed whey.

11. A method for extending a comminuted meat product which comprises admixing with a meat or meat by-product containing mixture, suitable for making a comminuted meat product, an extender comprising lactose hydrolyzed whey which has a protein content of from about 2 to about 90 percent on a dry weight basis and which had, before hydrolysis, a lactose content of from about 5 to about 85 percent on a dry weight basis, which lactose is at least about 30 percent hydrolyzed.

12. The method of claim 11 in which the lactose is at least about 40 percent hydrolyzed.

13. The method of claim 11 in which the lactose is at least about 70 percent hydrolyzed.

14. The method of claim 11 in which the protein content of the hydrolyzed whey is from about 8 to about 60 percent by weight.

15. The method of claim 11 in which the protein content of the hydrolyzed whey is from about 8 to about 20 percent by weight.

16. The method of claim 11 in which the hydrolyzed whey had, before hydrolysis, a lactose content of from about 20 to about 85 percent by weight.

17. The method of claim 11 in which the hydrolyzed whey had, before hydrolysis, a lactose content of from about 60 to about 80 percent by weight.

18. The method of claim 11 in which the hydrolyzed whey has a protein content of from about 8 to about 60 percent by weight and had, before hydrolysis, a lactose content of from about 20 to about 85 percent by weight, which lactose is at least about 40 percent hydrolyzed.

19. The method of claim 11 in which the hydrolyzed whey has a protein content of from about 8 to about 20 percent by weight and had, before hydrolysis, a lactose content of from about 60 to about 80 percent by weight, which lactose is at least about 40 percent hydrolyzed.

20. The method of claim 11 in which at least one extender in addition to lactose hydrolyzed whey is admixed with the meat or meat by-product containing mixture.

* * * * *